March 29, 1927.

O. C. TOWLE

AUTOMOBILE STORAGE BATTERY

Filed Aug. 11, 1925

1,622,550

Inventor
Owen C. Towle;
By R. S. Berry
Attorney.

Patented Mar. 29, 1927.

1,622,550

UNITED STATES PATENT OFFICE.

OWEN C. TOWLE, OF LOS ANGELES, CALIFORNIA, ASSIGNOR TO EUGENE M. BROWN, OF LOS ANGELES, CALIFORNIA.

AUTOMOBILE STORAGE BATTERY.

Application filed August 11, 1925. Serial No. 49,632.

This invention particularly pertains to a device adapted to be applied to the binding posts of storage batteries and has as its primary object the provision of a means whereby sloppage of acid and passage of fumes through the seal around the post will be inhibited.

Another object is to provide a device of the above character which is acid resistant throughout and which is so constructed that it may be readily applied to a battery binding post to effect intimate contact therewith and with the battery cover.

The invention resides generally in the provision of an annulus formed of lead or other suitable acid-resistant material and in forming the annulus with an inturned margin and a downturned margin to which margins are applied resilient washers composed of rubber composition or other suitable acid-resisting material.

The invention is illustrated in the accompanying drawings, in which:—

Figure 1:
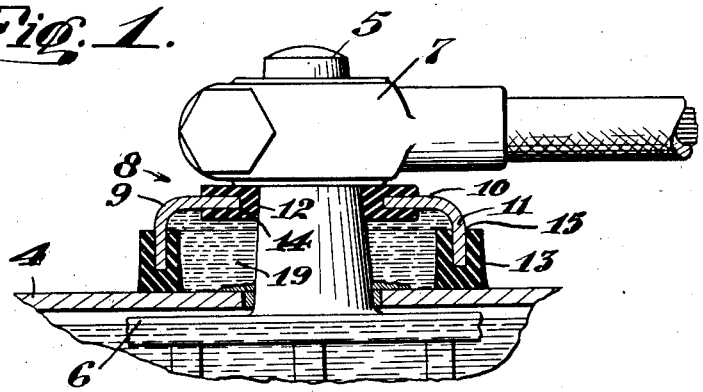
Fig. 1 is a view in vertical section illustrating the application of the invention to the binding posts of a storage battery and showing the attachment as seen on the line 1—1 of Fig. 2.
Figure 2:
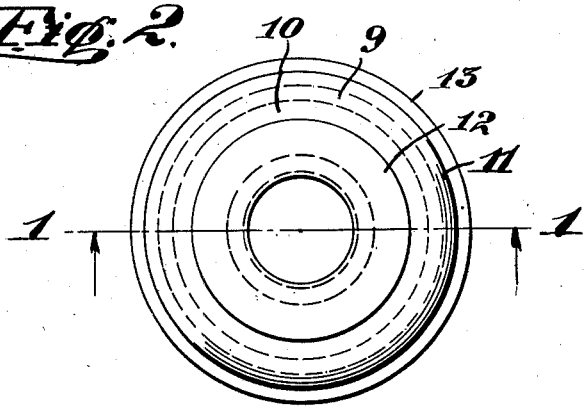
Fig. 2 is a plan view of the device.

Referring to the drawings more specifically, 4 indicates the top wall or cover of a battery, 5 designates a binding post projecting through the wall 4 and connecting at its lower end with the battery plates 6, and to the upper end of which binding post is attached a clamp 7 in the manner common in wet storage battery terminal construction such as is ordinarily employed in the storage batteries used in the electrical systems of motor vehicles and the like.

Figure 3:
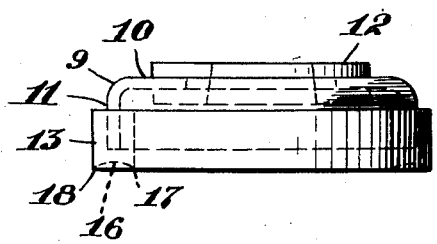
Fig. 3 is a view of the device as seen in side elevation.

8 indicates generally the device embodying the present invention which comprises a rigid annulus 9 formed of lead or other acid-resisting material, which annulus is formed with an inturned marginal lip or flange 10 and with a downturned marginal flange 11. Annular washers 12 and 13 formed of rubber or other suitable resilient material of acid-resisting character are mounted on the flanges 10 and 11 to project beyond the end faces thereof; the washer 12 being formed with a circumferentially extending channel 14 on its outer periphery to receive the flange 10, and the washer 13 being formed on its upper edge with a channel 15 to receive the flange 11. The underside of the washer 13 is dished as indicated at 16 in Fig. 3, to form lips 17 and 18 on the inner and outer lower peripheral edges of the washer.

In the application of the invention the device is placed to encircle the binding post by inserting the latter through the washer 12 and advancing the device on the binding post until the washer 13 is brought into contact with the battery top. The washer 12 has an internal diameter slightly less than that of the binding post which latter is spaced, thus affording a close contact between the washer 12 and the binding post.

The inwardly and downwardly projecting flanges 10 and 11 with the washers 12 and 13 thereon afford a space within the device surrounding the base portion of the binding post, which space is preferably filled with a heavy grease as indicated at 19 in Fig. 1. The clamp 7 is then engaged with the upper end portion of the binding post and positioned to bear on the washer 12 so as to crowd the washer 13 tightly against the battery top.

It will now be seen that by the use of this device the sloppage of acid or leakage of fumes from the interior of the battery up around the binding post will be effectively prevented thereby obviating corrosion of the binding post and clamp, and thus avoiding the difficulties incident to and arising from such corrosion.

I claim:—

1. An attachment for the binding posts of storage batteries, comprising an annulus formed with an inturned marginal flange and a downwardly extending marginal flange, a resilient washer formed with a peripheral channel receiving the inturned marginal flange, said washer being adapted to encircle a binding post, and a second resilient washer formed with a top channel to receive the downwardly extending flange and adapted to seat on the top of the battery.

2. An attachment for the binding posts of storage batteries, comprising an annulus formed with an inturned marginal flange and a downwardly extending marginal flange, a resilient washer formed with a peripheral channel receiving the inturned marginal flange, said washer being adapted to encircle a binding post and contact therewith, and a second resilient washer formed with a top channel to receive the downwardly extending flange and adapted to seat on the top of the battery, said last named washer being formed with a dished lower surface.

3. An attachment for storage batteries comprising in combination with a binding post and the battery top wall through which the binding post projects, of an annulus having an inturned marginal flange and a downturned flange, washers projecting from the end faces of said flanges; one of which washers is adapted to encircle and abut against the binding post and the other washer being adapted to seat on the top wall of the battery; said annulus and washers forming a chamber around the binding post; and a grease packing within said chamber.

In testimony whereof I have affixed my signature.

OWEN C. TOWLE.